3,020,205
RECOVERY OF SULFUR FROM SULFATES
Mead Le Roy Jensen, Cheshire, Conn., assignor to
Callahan Mining Corp., New York, N.Y.
No Drawing. Filed Oct. 9, 1958, Ser. No. 766,208
7 Claims. (Cl. 195—2)

This invention relates to a process of recovering sulfur from ores and more particularly to a process of recovering sulfur from sulfate ores.

With the depletion of the great Texas and Louisiana deposits of native sulfur the cost of sulfur is rising, making more acute the problem of locating a cheap supply of sulfur. The nation abounds in various sulfate deposits, which, with suitable recovery processes might provide a source of sulfur for industry. Among the sulfates readily available are vast gypsum and anhydrite deposits. Anhydrite ($CaSO_4$), which is practically worthless, is abundant and gypsum ($CaSO_4 \cdot 2H_2O$), which is now used primarily to make plaster of Paris ($CaSO_4 \cdot \frac{1}{2}H_2O$), is less abundant. Other sulfates available as a source of sulfur are the sulfates of sodium (Glauber's salt), magnesium (Epson salt), copper (blue vitriol), iron (green vitriol), zinc (white vitriol) and the like. With this large amount of sulfur bearing raw material available, it is apparent that a process or method which is capable of extracting sulfur from sulfur bearing ores, economically, will meet with commercial success.

In view of the foregoing, an object of my invention is to provide a process of producing sulfur from sulfate ores cheaply and effectively.

Another object of my invention is to provide a process of extracting sulfur from available sulfate ores by a simple process without the necessity of employing expensive raw materials and reagents.

Still another object of my invention is to provide a process for treating sulfate ores in situ, to produce sulfur cheaply and effectively.

Another object of my invention is to provide a process for treating sulfate ores in processing plants to produce sulfur, thereby taking advantage of modern automation techniques.

A still further object of my invention is to provide a process of recovering sulfur from soluble and slightly soluble sulfates.

Other objects and many of the attendant advantages of my invention will be readily appreciated as the same becomes better understood by reference to the following detailed description.

I have discovered that sulfate ores such as those of the slightly soluble and soluble sulfates may be beneficially processed to produce sulfur cheaply in forms for direct use in industry. Essentially, my process involves the anerobic fermentation and reduction of sulfate ore to produce hydrogen sulfide gas and the oxidation of the gas to produce commercial sulfur bearing compounds. The fermentation is brought about by the action of sulfate reducing bacteria, such as the desulfovibrio strain, upon the ore, to produce hydrogen sulfide gas. The gas produced is collected and oxidized to water and elemental sulfur or to sulfur dioxide, as the case may be, for direct use by the industry. The process is simple and therefore may be carried out in situ, or in processing plants, as desired.

When the process is carried out in situ, that is, at evaporate sulfate beds or the like, the anhydrite is inoculated with water containing sulfate reducing bacteria of the class described. The anhydrite or the like dissolves in the water and the bacteria acts on the dissolved sulfate resulting in the production of gaseous hydrogen sulfide. The hydrogen sulfide gas produced is collected at a gas house located above ground and oxidized to water and elemental sulfur or to sulfur oxide. The amount of ore dissolved in the water depends upon the solubility of the sulfate being processed, but as the dissolved sulfate concentration is progressively reduced by fermentation, more sulfate goes into solution. Bacteria is added from time to time to keep the production of hydrogen sulfide gas above a certain prescribed minimum. In addition, petroleum or the like may be added to provide an organic food supply for the bacteria thereby insuring efficient attack by the bacteria upon the sulfate ore. It should be understood that various strains of the bacteria may be developed for use in the process and that conditions in the solution will vary from strain to strain accordingly, and therefore the addition of petroleum or the like may or may not be necessary or desirable.

When the process is carried out in processing plants, it may be done in tanks which are provided with chambers for collecting the liberated hydrogen sulfide gas. The collected gas is then oxidized and commercial sulfur bearing compounds produced. The ore chosen may include one or more of the following: the sulfates of sodium, magnesium, copper, iron, zinc, calcium or the like. Although the calcium sulfates are only slightly soluble in water as compared to the other sulfates mentioned, their use is preferred because they are cheap and abundant. The solubility of anhydrite (calcium sulfate) is only about .2 gram per 100 milliliters of water, but this concentration is sufficient for the reaction to take place. When using a slightly soluble sulfate such as anhydrite, it is wise to add an excess amount of ore (over and above the amount soluble in the water) so that as the concentration is reduced by the conversion of the sulfate to hydrogen sulfide, excess sulfate in the tank will be dissolved, causing the amount of dissolved sulfate in the water to remain stable. As mentioned above, petroleum or the like may be added to the tank to provide an organic food supply for the bacteria. The hydrogen sulfide gas produced may be flushed from the tanks through pipes by atmospheric air and then ignited. If the hydrogen sulfide is oxidized in accordance with the following equation, water and sulfur are produced:

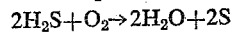
$$2H_2S + O_2 \rightarrow 2H_2O + 2S$$

If the hydrogen sulfide gas is oxidized in an excess of oxygen, sulfur dioxide and water are produced. The process can be carried out in several tanks or vats and if the production from one tank is continuously high, bacteria from this tank could replace the "drones" in the least productive tank. In this way, production of hydrogen sulfide gas can be kept above a certain prescribed minimum thus making the entire operation economically practical. For example, when proceeding according to the plant processing technique, a tank 100 feet long, 25 feet wide and 3 feet high is first filled with water into which 30 to 40 pounds of anhydrite are added. A few barrels of petroleum are added plus an appropriate amount of bacteria and the production of hydrogen sulfide gas begins. Additional bacteria, petroleum and anhydrite are added from time to time as required. From a hundred of such tanks the production of hydrogen sulfide is about 40 tons per day, which is the equivalent of about 38 tons of sulfur per day. The yield will vary, depending upon the species of the desulfovibrio strain chosen, the conditions in the tank and the like.

In conclusion, it should be noted that the processes described above can be carried out with a minimum amount of equipment and labor to produce substantial amounts of sulfur safely, effectively and economically, thereby providing the industry with a cheap supply of sulfur.

It will thus be seen that the objects set forth above, among those made apparent from the preceding description, are efficiently attained and, since certain changes may be made in carrying out the above process, without departing from the scope of the invention, it is intended that all matter contained in the above description shall be interpreted as illustrative and not in a limiting sense.

What I claim and desire to protect by Letters Patent of the United States is:

1. A process of recovering sulfur from sulfate ore chosen from the group of soluble and slightly soluble inorganic sulfates comprising the steps of, dissolving the sulfates in a water solution, subjecting the dissolved sulfate to fermentation by anaerobic bacteria of the genus Desulfovibrio thereby causing the liberation of hydrogen sulfide gas and then oxidizing said hydrogen sulfide gas to produce sulfur.

2. A process of recovering sulfur dioxide from sulfate ore chosen from the group of soluble and slightly soluble inorganic sulfates comprising the steps of, dissolving the sulfates in a water solution, subjecting the dissolved sulfate to fermentation by anaerobic bacteria of the genus Desulfovibrio thereby causing the liberation of hydrogen sulfide gas and then oxidizing said hydrogen sulfide gas to produce sulfur dioxide.

3. A process for recovering sulfur in situ from evaporate beds of inorganic sulfate ore chosen from the group of soluble and slightly soluble sulfates comprising the steps of, inoculating said ore bed with water containing anaerobic bacteria of the genus Desulfovibrio to cause the liberation of hydrogen sulfide gas by the action of said bacteria on the dissolved sulfates, removing the hydrogen sulfide gas liberated immediately from the ore bed and collecting said gas in a gas house located above ground and oxidizing said hydrogen sulfide gas with substantially stoichiometric amounts of oxygen to elemental sulfur and water.

4. A process for recovering sulfur dioxide in situ from evaporate beds of inorganic sulfate ore chosen from the group of soluble and slightly soluble sulfates comprising the steps of, inoculating said ore bed with water containing anaerobic bacteria of the genus Desulfovibrio to cause the liberation of hydrogen sulfide gas by action of said bacteria on the dissolved sulfates, removing the hydrogen sulfide liberated immediately from the ore bed and collecting said gas in a gas house located above ground and oxidizing said hydrogen sulfide gas to sulfur dioxide.

5. A process for recovering sulfur from ores containing soluble inorganic sulfates comprising the steps of boring a hole to a sulfate containing underground ore bed, inoculating the ore bed with water containing anaerobic bacteria of the genus Desulfovibrio to dissolve the sulfates and to reduce the dissolved sulfates by bacterial action, thus producing hydrogen sulfide gas, removing the hydrogen sulfide gas through the bored hole as it is produced by said bacterial action, collecting the hydrogen sulfide gas in a reactor at the surface and then oxidizing the hydrogen sulfide gas to produce sulfur.

6. The process defined in claim 5 with the added step of adding a bacteria nutrient to the water at the ore bed at substantially regular intervals.

7. A process for recovering sulfur from ores containing soluble and slightly soluble inorganic sulfates comprising the steps of dissolving the sulfates in water containing anaerobic bacteria of the genus Desulfovibrio in a number of tanks, adding a nutrient to said water to maintain said bacteria in a visible condition, removing hydrogen sulfide gas from said tanks as it is produced by reduction of the dissolved sulfates by said bacteria, measuring the amount of hydrogen sulfide produced from each tank, replacing the bacteria culture in the least productive tank with a bacteria culture from the most productive tank until all tanks are producing hydrogen sulfide at substantially the same rate, and oxidizing the removed hydrogen sulfide gas to produce sulfur.

References Cited in the file of this patent
UNITED STATES PATENTS

| | | |
|---|---|---|
| 2,574,070 | Strawniski | Nov. 6, 1951 |
| 2,641,564 | Zobell | June 9, 1953 |
| 2,765,217 | Conroy et al. | Oct. 2, 1956 |

OTHER REFERENCES

World Oil, vol. 127, pages 35 to 38 and 40 (1947).

UNITED STATES PATENT OFFICE
CERTIFICATE OF CORRECTION

Patent No. 3,020,205 February 6, 1962

Mead Le Roy Jensen

It is hereby certified that error appears in the above numbered patent requiring correction and that the said Letters Patent should read as corrected below.

Column 4, line 25, for "visible" read -- viable --.

Signed and sealed this 12th day of June 1962.

(SEAL)
Attest:

ERNEST W. SWIDER
Attesting Officer

DAVID L. LADD
Commissioner of Patents